US010515770B2

(12) United States Patent
Gregory

(10) Patent No.: US 10,515,770 B2
(45) Date of Patent: Dec. 24, 2019

(54) COMPRESSIBLE HOUSING

(71) Applicant: HEWLETT-PACKARD DEVELOPMENT COMPANY, L.P., Houston, TX (US)

(72) Inventor: Scott Gregory, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/076,548

(22) PCT Filed: Jan. 31, 2017

(86) PCT No.: PCT/US2017/015786
§ 371 (c)(1),
(2) Date: Aug. 8, 2018

(87) PCT Pub. No.: WO2018/143927
PCT Pub. Date: Aug. 9, 2018

(65) Prior Publication Data
US 2019/0051470 A1    Feb. 14, 2019

(51) Int. Cl.
| *H01H 13/04* | (2006.01) |
| *G06K 7/14* | (2006.01) |
| *H01H 1/58* | (2006.01) |
| *H01H 13/26* | (2006.01) |
| *H01H 3/00* | (2006.01) |

(52) U.S. Cl.
CPC ........ *H01H 13/04* (2013.01); *G06K 7/1404* (2013.01); *H01H 1/5805* (2013.01); *H01H 13/26* (2013.01); *H01H 2003/007* (2013.01); *H01H 2221/042* (2013.01); *H01H 2221/09* (2013.01)

(58) Field of Classification Search
CPC ...... H01H 13/04; H01H 1/5805; H01H 13/26; G06K 7/1404
USPC ........................................................ 200/505
See application file for complete search history.

(56) References Cited

U.S. PATENT DOCUMENTS

| 4,639,606 A | 1/1987 | Boles et al. |
| 5,496,992 A | 3/1996 | Madan et al. |
| 5,512,892 A | 4/1996 | Corballis et al. |
| (Continued) | | |

FOREIGN PATENT DOCUMENTS

| DE | 10163688 A1 | 7/2003 |
| EP | 0665446 A2 | 8/1995 |

OTHER PUBLICATIONS

"Cordless Ring Scanner (CRS)—Series 9", Socket Mobile, 2016, 3 Pages.

*Primary Examiner* — Edwin A. Leon
*Assistant Examiner* — Iman Malakooti
(74) *Attorney, Agent, or Firm* — Brooks, Cameron & Huebsch, PLLC

(57) ABSTRACT

Examples relate to a compressible housing. An electronic switch may include a circuit board. A first conductive surface may be coupled to the circuit board and a second conductive surface may be located proximate to the first conductive surface. A compressible spacer may be located between the first conductive surface and the second conductive surface to space the first conductive surface away from the second conductive surface. Further, a compressible housing may deform when under compression and may cause, via deformation of the compressible spacer, the first conductive surface to contact the second conductive surface.

15 Claims, 4 Drawing Sheets

(56) References Cited

U.S. PATENT DOCUMENTS

| | | | | |
|---|---|---|---|---|
| 5,565,671 | A | * | 10/1996 | Kirkeby ............. G06K 7/10564 |
| | | | | 235/462.47 |
| 6,664,901 | B1 | * | 12/2003 | Yamada ............... H01H 13/702 |
| | | | | 200/302.1 |
| 9,321,990 | B2 | | 4/2016 | Berns et al. |
| 2001/0038037 | A1 | | 11/2001 | Bridgelall et al. |
| 2009/0230197 | A1 | * | 9/2009 | Tanner ............. G06K 19/07345 |
| | | | | 235/492 |
| 2014/0144682 | A1 | * | 5/2014 | Orlowski ................. H05K 3/00 |
| | | | | 174/257 |

\* cited by examiner

COMPRESSIBLE HOUSING

BACKGROUND

Electronic switches may be used in circuits to selectively complete the circuit and activate elements of the circuit. An electronic switch may be selectively completed using a trigger mechanism which may complete the circuit through manipulation.

DETAILED DESCRIPTION

Electronic switches may be used to complete circuits. For example, some circuits can be selectively triggered by manipulating a trigger sized to be triggered by an individual finger of an end user. For example, on a barcode scanner, a trigger may be used to complete a circuit via an electronic switch. In such examples, an area of the trigger may be small compared to an area of a barcode scanner. For instance, the trigger may be a small percentage, perhaps less than 10%, of an overall area of the overall barcode scanner. As a result, end user placement of a finger on the trigger and/or end user activation of the trigger may be difficult.

Accordingly, the disclosure is directed to a compressible housing. For example, a compressible housing may include an electronic switch comprising a circuit board, a first conductive circuit coupled to the circuit board, a second conductive circuit located proximate to the first conductive surface, a compressible spacer between the first conductive surface and the second conductive surface, and a compressible housing to deform when under compression and cause, via deformation of the compressible spacer, the first conductive surface to contact the second conductive surface.

Desirably, an electronic switch according to the disclosure may be triggered without using a trigger such as those comprising 15% or less of an overall device. Rather, a compressible housing may comprise an area larger than 15% of an overall apparatus containing an electronic switch according to the disclosure than other approaches such as those employing a trigger. As described herein, compression of the compressible housing may trigger the electronic switch and thereby promote ease of operation of a device including the electronic switch.

Figure 1:
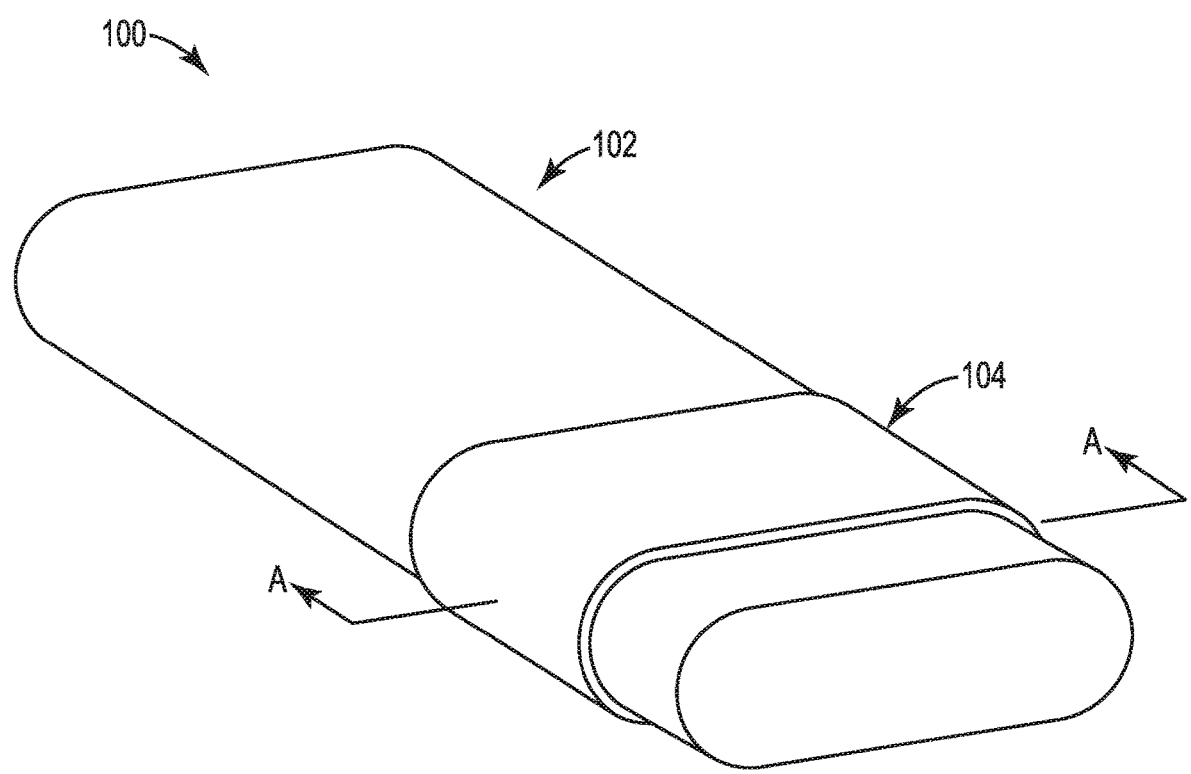
FIG. 1 is an example of an apparatus including a compressible housing according to the disclosure.

FIG. 1 is an example of an apparatus 100 including a compressible housing according to the disclosure. Apparatus 100 may include a body 102. Body 102 may contain components of an electronic switch. Body 102 may be made of plastic, metal, and/or another rigid material.

Apparatus 100 may further include a compressible housing 104. Compressible housing 104 may fit over housing 102, as shown in FIG. 1. Compressible housing 104 may be made of rubber or any other suitable compressible material. Compressible housing 104 is further discussed herein with respect to FIGS. 2 and 3.

Figure 2:
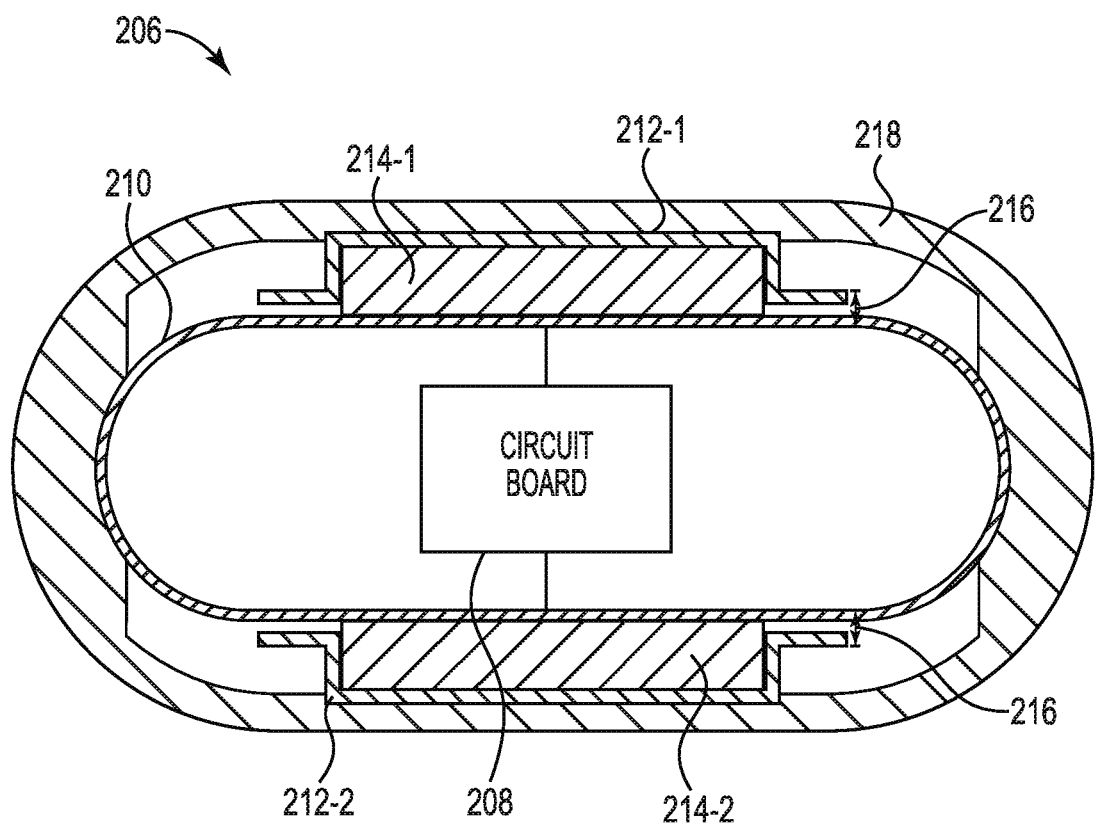
FIG. 2 is a cut-away view of an example of an apparatus including a compressible housing according to the disclosure, bisected along line A-A of FIG. 1.

FIG. 2 is a cut-away view of an example of an apparatus 206 including compressible housing according to the disclosure, bisected along line A-A of FIG. 1. As shown in FIG. 2, apparatus 206 may include a circuit board 208 coupled to a first conductive surface 210. As used herein, a circuit board refers to a board which mechanically supports and electrically connects electronic components using conductive tracks, pads and/or other features. For instance, circuit board 208 may include copper tracks and conductive surfaces attached to a substrate. Various electrical components, such as capacitors and resistors, may be soldered to circuit board 208.

As mentioned, circuit board 208 may be coupled to a first conductive surface 210. As used herein, a conductive surface refers to a surface containing a metallic or other type of coating suitable for conducting electricity. That is, in various examples, the first conductive surface 210 may be a metallic coating on a substrate. In some examples, the metallic coating may be disposed on a body (e.g. body 104 as shown in FIG. 1). As shown in FIG. 2, the first conductive surface 210 may be located around an entirety of a body, such as body 104.

Apparatus 206 may include a second conductive surface 212 formed of second conductive surface 212-1 and/or an additional second conductive surface 212-2. As shown in FIG. 2, the second conductive surface 212-1, 212-2 may be located proximate to first conductive surface 210. That is, the second conductive surface 212-1, 212-2 may be adjacent to the first conductive surface 210 The second conductive surface 212-1, 212-2 may be formed from a conductive material, such as copper, gold, silver, among other possible conductive materials.

Apparatus 206 may include a compressible spacer 214 formed of a compressible spacer 214-1 and/or an additional compressible spacer 214-2. Compressible spacer 214 may be located between first conductive surface 210 and second conductive surface 212. As shown in FIG. 2, compressible spacer 214 may space first conductive surface 210 away from second conductive surface 212 by a distance. Compressible spacer 214 may be made from rubber, foam, plastic, or any other surface that is able to space first conductive surface 210 away from second conductive surface 212 by distance 216 yet compress to permit contact of the first and second conductive surfaces when pressure is applied.

Apparatus 206 may include a compressible housing 218. As shown in FIG. 2, compressible housing 218 may be located proximate to a second conductive surface 212 (formed of 212-1 and/or 212-2). Compressible housing 218 may be coupled to the second conductive surface 212. In some examples, compressible housing 218 may include a cutout. A first portion of the second conductive surface 212 may be disposed within the cutout included in compressible housing 218, thus coupling the second conductive surface 212 to the compressible housing 218. A second portion of the second conductive surface 214 may be disposed outside the cutout of the housing 218.

Compressible housing 218 may be made of rubber or any other material able to compress and deform when force is applied. When compressible housing 218 is compressed, compressible spacer 216 may deform. Distance 216 may decrease and the first conductive surface 210 may contact the second conductive surface 212. In some examples, the first conductive surface 210 may contact the second portion of the second conductive surface 212 located outside compressible housing 218.

In some examples, the contacting of the first conductive surface 210 and the second conductive surface 212 via compression of the compressible housing 218 and compressible spacer 214 may cause a circuit located on circuit board 208 to close, or be completed. In such an example, the contact of the first conductive surface 210 and the second conductive surface 212 may cause activation of circuit board 208.

Figure 3:
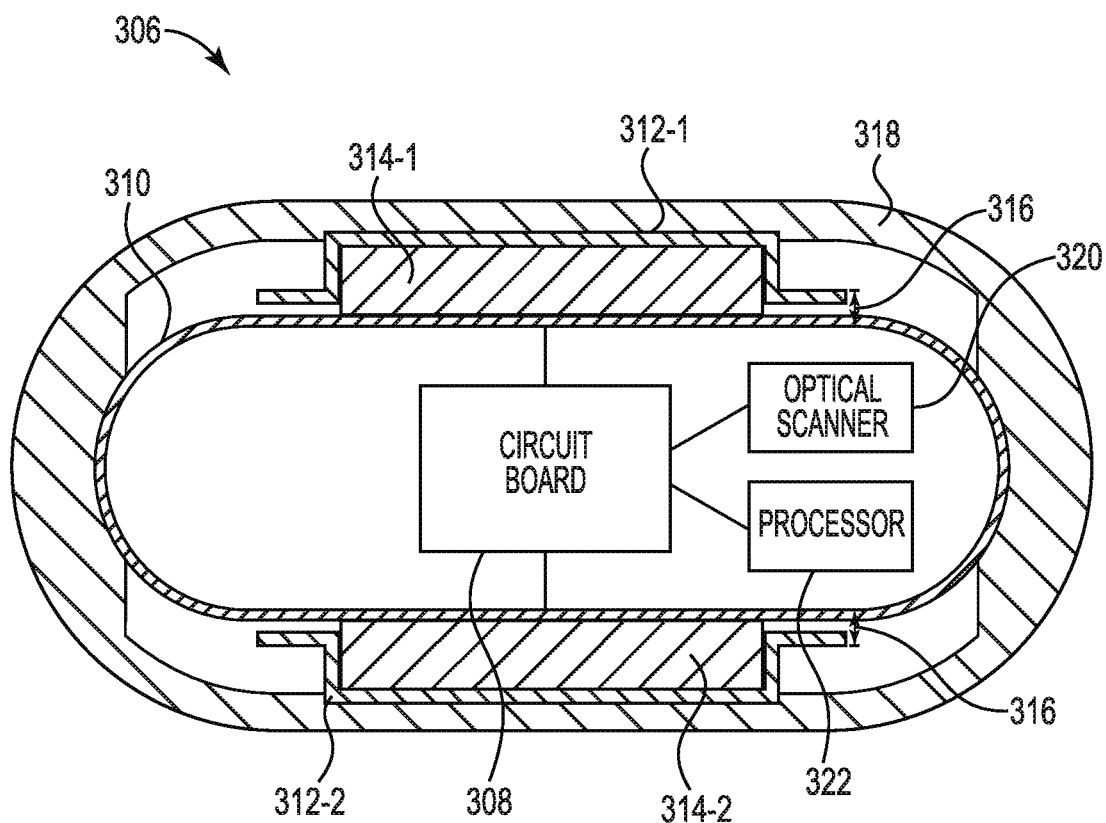
FIG. 3 is an example of an apparatus including a compressible housing according to the disclosure.

FIG. 3 is an example of an apparatus 306 including a compressible housing according to the disclosure. Apparatus 306 may include a circuit board 308. Circuit board 308 may be the same as or similar to circuit board 208, discussed with respect to FIG. 2. Apparatus 306 may further include a first conductive surface 310. The first conductive surface 310 may be the same as or similar to the first conductive surface 210, described with respect to FIG. 2. As shown in FIG. 3, the first conductive surface 310 may be coupled to circuit board 308.

Apparatus 306 may include a second conductive surface 312. The second conductive surface 312 may be the same as or similar to the second conductive surface 212, discussed with respect to FIG. 2. The second conductive surface 312 may be spaced from the first conductive surface 310 by distance 316 via a compressible spacer 314. Compressible spacer 314 may be the same as or similar to compressible spacer 214, discussed with respect to FIG. 2.

Apparatus 306 may further include a compressible housing 318. Compressible housing 318 may be the same as or similar to compressible housing 218, discussed with respect to FIG. 2. In some examples, compressible housing 318 may comprise between 25% and 33% of the apparatus 306. In some examples, compressible housing 318 may comprise between 15% and 25% of the apparatus 306.

As discussed with respect to FIG. 2, compressible housing 318 may deform under force or pressure, causing deformation of compressible spacer 314. When compressible spacer 314 is deformed, distance 316 may decrease, causing the first conductive surface 310 to contact second the second conductive surface 312. In some examples, the circuit board may be activated upon contact between the first conductive surface 310 and the second conductive surface 312.

Apparatus 306 may further include an optical scanner 320. As used herein, an optical scanner refers to a device that uses a light beam to recognize characters or patterns printed on a surface. In some examples, an optical scanner may use a laser to detect and recognize the characters or patterns. In some examples, non-visible light beams, such as an infrared beam, may be used. In some examples, the light beam may include a targeting pattern. A light beam may be aligned to and/or based on the targeting pattern, such as alignment to and/or based on the characters and/or patterns of the targeting pattern.

As shown in FIG. 3, optical scanner 320 may be coupled to circuit board 308. In some examples, circuit board 308 may control optical scanner 320. Said differently, optical scanner 320 may be activated upon activation of circuit board 308. Thus, when circuit board 308 is activated by the contact of the first conductive surface 310 and the second conductive surface 312, circuit board 308 may activate optical scanner 320.

Optical scanner 320 may be deactivated by the circuit board 308 in response to the first conductive surface 310 breaking contact with the second conductive surface 312. In some examples, the first conductive surface 310 and the second conductive surface 312 may break contact when compressible housing 318 is released. When compressible housing 318 is released, compressible spacer 314 may also release, restoring distance 316 and breaking contact between the first conductive surface 310 and the second conductive surface 312. In such an example, circuit board 308 may be deactivated and thus may case optical scanner 320 to deactivate.

Apparatus 306 may further include a processor 322. Processor 322 may be a hardware processor such as a central processing unit (CPU), a semiconductor based microprocessor, and/or other hardware devices suitable for retrieval, reception, and/or execution of instructions. In some examples, processor 322 may be coupled to circuit board 308. In such examples, processor 322 may be activated upon activation of circuit board 308. That is, processor 322 may be activated when the first conductive surface 310 contacts the second conductive surface 312 to activate circuit board 308. In some examples, processor 322 may be activated in response to activation of optical scanner 320.

In some examples, processor 322 may be coupled to optical scanner 320. In such examples, processor 322 may receive information and instructions from optical scanner 320. For example, when optical scanner 320 is activated, optical scanner may capture a pattern. Processor 322 may then receive the captured pattern from optical scanner 320. In some examples, processor 322 may further read, interpret, or decode the pattern captured by optical scanner 320. For example, optical scanner 320 may capture a barcode pattern and transmit the captured barcode pattern to processor 322. Processor 322 may then interpret and decode the barcode pattern. Processor 322 may further determine that the barcode patter captured by optical scanner 320 corresponds to a particular product or item.

Figure 4:
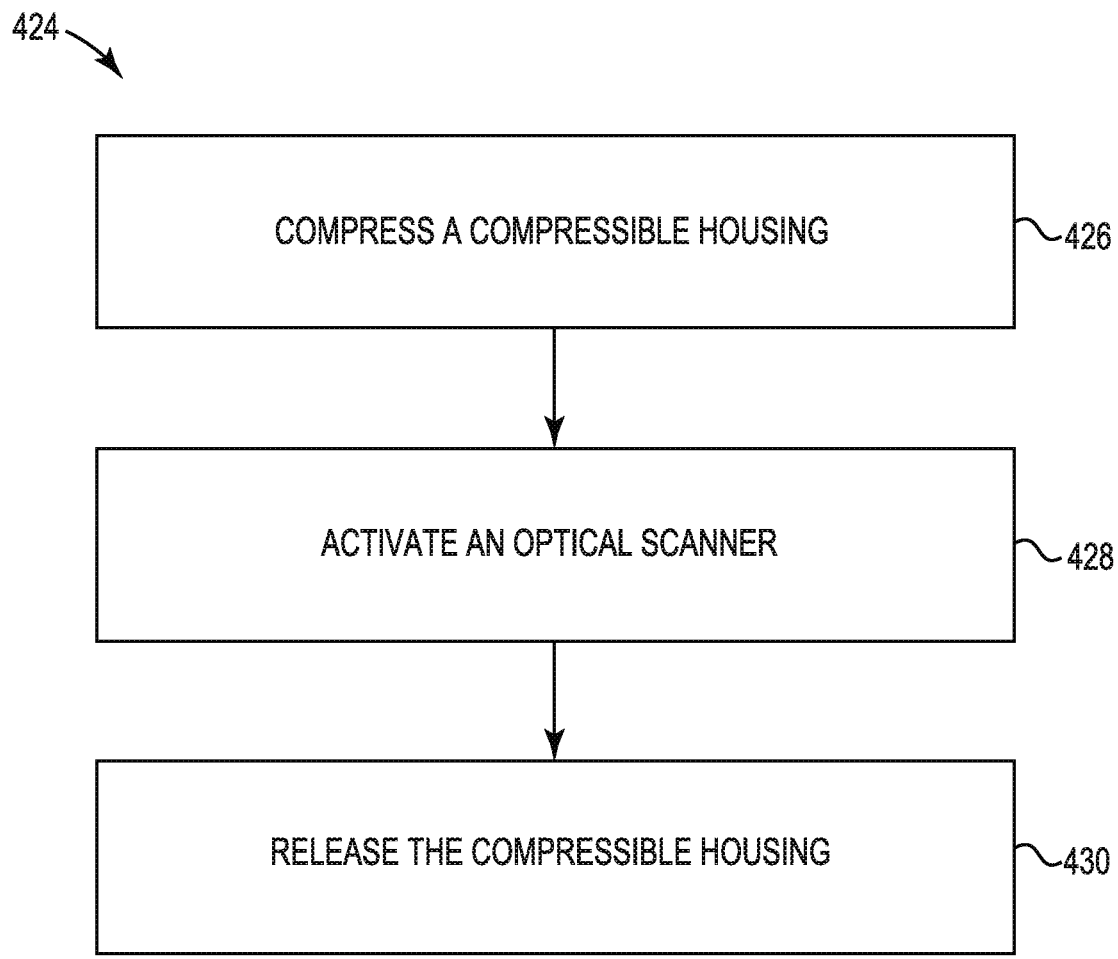
FIG. 4 is an example of a method suitable with a compressible housing according to the disclosure.

FIG. 4 is an example of a method 424 suitable with a compressible housing according to the disclosure. At 426, method 424 may include compressing a compressible housing. Compressing a compressible housing at 426 may include applying compression to cause the spacer to deform sufficient to cause contact of the first and second conductive surfaces. As described with respect to FIGS. 2 and 3, compression of the compressible housing may cause deformation of a compressible spacer. The compression of the compressible housing and the deformation of the compressible spacer may cause a first conductive surface to contact a second conductive surface, as described with respect to FIGS. 2 and 3.

At 428, method 424 may include activating an optical scanner. In some examples, the optical scanner may be activated in response to the first conductive surface contacting the second conductive surface, as described with respect to FIGS. 2 and 3. In some examples, activating the optical scanner at 428 may include activating a circuit of the optical scanner. Activating a circuit may then trigger a plurality of lights contained within the optical scanner. As described with respect to FIG. 3, the plurality of lights contained with the optical scanner may be laser lights, infrared lights, or any other type of lights.

At 430, method 424 may include releasing the compressible housing. Releasing the compressible housing at 430 may include decreasing compression on the compressible housing sufficient to cause the compressible spacer to reform and separate the first and second conductive surfaces. As described with respect to FIGS. 2 and 3, releasing the compressible housing at 430 may cause the first conductive surface and the second conductive surface to break contact. In some examples, the first conductive surface and the second conductive surface may break contact due to reformation of a compressible spacer, such as compressible spacer 214 or 314, discussed with respect to FIGS. 2 and 3, respectively.

In the foregoing detail description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the disclosure.

The figures herein follow a numbering convention in which the first digit corresponds to the drawing figure number and the remaining digits identify an element or component in the drawing. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

What is claimed:

1. An electronic switch comprising:
   a circuit board;
   a first conductive surface coupled to the circuit board;
   a second conductive surface located proximate to the first conductive surface;
   a compressible spacer between the first conductive surface and the second conductive surface to space the first conductive surface away from the second conductive surface; and
   a single, integral housing that is compressible to deform when under compression and cause, via deformation of the compressible spacer, the first conductive surface to contact the second conductive surface, wherein the second conductive surface is included within a body of the compressible housing.

2. The electronic switch of claim 1, wherein the first conductive surface comprises a metallic coating on a substrate.

3. The electronic switch of claim 1, wherein a first portion of the second conductive surface is disposed within a cutout included in the compressible housing to couple the second conductive surface to the compressible housing.

4. The electronic switch of claim 3, wherein a second portion of the second conductive surface is outside the cutout in the compressible housing.

5. A scanning device, comprising:
   a circuit board;
   a first conductive surface coupled to the circuit board;
   a second conductive surface located proximate to the first conductive surface;
   a compressible spacer between the first conductive surface and the second conductive surface to space the first conductive surface away from the second conductive surface;
   a single, integral housing that is compressible to deform when under compression and cause the first conductive surface to contact the second conductive surface via deformation of the compressible spacer;
   an optical scanner coupled to the circuit board to capture a barcode pattern; and
   a processor to read the captured barcode pattern.

6. The scanning device of claim 5 wherein circuit board activates the optical scanner when the second conductive surface contacts the first conductive surface.

7. The scanning device of claim 5, wherein the circuit board deactivates the optical scanner when the second conductive surface breaks contact with the first conductive surface.

8. The scanning device of claim 5, wherein the processor is activated in response to activation of the optical scanner.

9. The scanning device of claim 5, wherein the compressible housing comprises between 15% and 33% of an overall surface area of the scanning device.

10. The scanning device of claim 5, wherein the compressible housing comprises between 25% and 33% of an overall surface area of the scanning device.

11. The scanning device of claim 5, wherein the compressible housing comprises between 15% and 25% of an overall surface area of the scanning device.

12. The scanning device of claim 6, wherein the compressible housing is rubber, silicone rubber, or combinations thereof.

13. The scanning device of claim 6, wherein the second conductive surface is formed from a conductive material selected from gold, silver, copper, or combinations thereof.

14. A method, comprising:
   compressing a single, integral housing that is compressible to cause deformation of a compressible spacer and cause a first conductive surface to contact a second conductive surface;
   activating an optical scanner in response to the contact of the first conductive surface and the second conductive surface; and
   releasing the compressible housing to cause the first conductive surface to break contact with the second conductive surface by reformation of the compressible spacer.

15. The method of claim 14, wherein activating the optical scanner includes activating a circuit to trigger a plurality of lights contained within the optical scanner.

* * * * *